(12) United States Patent
Zeng et al.

(10) Patent No.: US 10,404,518 B2
(45) Date of Patent: Sep. 3, 2019

(54) COMMUNICATIONS METHOD AND APPARATUS

(71) Applicant: HUAWEI TECHNOLOGIES CO., LTD., Shenzhen, Guangdong (CN)

(72) Inventors: Kun Zeng, Chengdu (CN); Huang Huang, Chengdu (CN); Guangjian Wang, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/052,519

(22) Filed: Aug. 1, 2018

(65) Prior Publication Data

US 2018/0343155 A1 Nov. 29, 2018

Related U.S. Application Data

(63) Continuation of application No. PCT/CN2016/111940, filed on Dec. 24, 2016.

(30) Foreign Application Priority Data

Feb. 3, 2016 (CN) .......................... 2016 1 0077981

(51) Int. Cl.
*H04L 5/00* (2006.01)
*H04L 27/26* (2006.01)
*H04W 72/04* (2009.01)

(52) U.S. Cl.
CPC ........ *H04L 27/2662* (2013.01); *H04L 5/0048* (2013.01); *H04L 27/2613* (2013.01);
(Continued)

(58) Field of Classification Search
CPC ............... H04L 27/2662; H04L 5/0048; H04L 27/2613; H04W 72/04; H04W 72/0446; H04W 72/042
See application file for complete search history.

(56) References Cited

U.S. PATENT DOCUMENTS 7,986,681 B2 7/2011 Astely et al.
8,331,265 B2 12/2012 Yong et al.
(Continued)

FOREIGN PATENT DOCUMENTS

CN 101286780 A 10/2008
CN 101388716 A 3/2009
(Continued)

*Primary Examiner* — Jaison Joseph
(74) *Attorney, Agent, or Firm* — Womble Bond Dickinson (US) LLP

(57) ABSTRACT

The present application discloses a communications method and apparatus. The method includes: determining a radio frame, where the radio frame includes a period, the period includes at least one first sub-period and at least one second sub-period, the first sub-period corresponds to a first procedure, and the second sub-period corresponds to a second procedure; the first sub-period includes n first time slices, different beams are used in adjacent first time slices in the n first time slices, there is a first guard interval between the adjacent first time slices, and the second sub-period includes m second time slices; and at least one first time slice is adjacent to at least one second time slice and there is no guard interval between the at least one first time slice and the at least one second time slice that are adjacent to each other; and performing communication by using the radio frame.

16 Claims, 10 Drawing Sheets

(52) U.S. Cl.
CPC ....... *H04W 72/04* (2013.01); *H04W 72/0446* (2013.01); *H04W 72/042* (2013.01)

(56) References Cited

U.S. PATENT DOCUMENTS

| | | |
|---|---|---|
| 2010/0214169 A1 | 8/2010 | Kafle |
| 2010/0265924 A1 | 10/2010 | Yong et al. |
| 2013/0235851 A1 | 9/2013 | Abu-Surra et al. |
| 2014/0254515 A1 | 9/2014 | Kim et al. |
| 2018/0255468 A1* | 9/2018 | Huang .................. H04W 16/28 |

FOREIGN PATENT DOCUMENTS

| | | |
|---|---|---|
| CN | 101400128 A | 4/2009 |
| EP | 2887558 A1 | 6/2015 |
| WO | 2014066785 A1 | 5/2014 |
| WO | 2014137174 A1 | 9/2014 |

\* cited by examiner

COMMUNICATIONS METHOD AND APPARATUS

CROSS-REFERENCE TO RELATED APPLICATIONS

This application is a continuation of International Application No. PCT/CN2016/111940, filed on Dec. 24, 2016, which claims priority to Chinese Patent Application No. CN 201610077981.9, filed on Feb. 3, 2016. The disclosure of aforementioned applications are hereby incorporated by reference in their entireties.

TECHNICAL FIELD

The present application relates to the field of communications technologies, and in particular, to a communications method and apparatus.

BACKGROUND

As requirements for a data transmission rate, communication quality, and the like of mobile communications become increasingly high, an existing sub-6 GHz frequency band used in mobile communications has become very crowded. A sub-6 GHz frequency spectrum may be referred to as a low frequency (LF). A frequency spectrum above 6 GHz may be referred to as a high frequency (HF). However, in a high frequency band of 6 GHz to 300 GHz, a large quantity of frequency spectrum resources are still not allocated for use. How to effectively use a high frequency is one of research focuses in the current communications industry.

Compared with radio propagation in a sub-6 GHz frequency band, radio propagation in a high frequency band has features such as a relatively high path loss, a relatively weak capability to penetrate an obstacle, and severe rain fade or oxygen fade at some frequencies. However, a high frequency band also has features of a short wavelength and easy implementation of a large-scale array antenna. Therefore, a high path loss caused by a high frequency band may be compensated for by using a directional antenna gain brought by a beamforming technology.

However, in a high-frequency system, due to a limitation of a beam width of a directional beam, a signal sent by using one directional beam can cover only a small area in a particular direction, and corresponding information cannot be successfully received outside the area. Therefore, if an omnidirectional coverage effect in an existing mobile communications system is desired, all combinations of directional beams on a transmit end and/or a receive end need to be traversed. However, transmission is interrupted each time beam switching occurs. For a frame structure, a portion of time-frequency resources are reserved as beam switching overheads.

In a high-frequency system, in different procedures such as a synchronization procedure, a random access procedure, a signaling control procedure, a data transmission procedure, and a beam training procedure, all or some of beam combinations need to be traversed, and a guard interval required for these beam switching operations leads to high overheads of the system.

SUMMARY

Embodiments of the present application provide a communications method and apparatus, to reduce beam switching overheads. Technical solutions are as follows:

According to a first aspect, an embodiment of the present application provides a communications method, including: determining a radio frame, where the radio frame includes a period, the period includes at least one first sub-period and at least one second sub-period, the first sub-period corresponds to a first procedure, and the second sub-period corresponds to a second procedure; the first sub-period includes n first time slices, different beams are used in adjacent first time slices in the n first time slices, there is a first guard interval between the adjacent first time slices, and the second sub-period includes m second time slices; each first time slice includes at least one symbol and each second time slice includes at least one symbol; at least one first time slice is adjacent to at least one second time slice and there is no guard interval between the at least one first time slice and the at least one second time slice that are adjacent to each other; and m and n are positive integers; and performing communication by using the radio frame.

Optionally, a same beam is used in the first time slice and the second time slice that are adjacent to each other.

In a possible implementation, all of the n first time slices are adjacent to each other.

Optionally, in a downlink synchronization and beam training procedure, the first sub-period includes x adjacent first time slice sets; each first time slice set includes $n_a$ first time slices; and for each first time slice set, downlink synchronization signals are sent by using $n_a$ transmit beams. In a downlink data transmission procedure, m is a quantity of transmit beams used in downlink data transmission.

Optionally, if downlink data is sent by using different transmit beams in adjacent second time slices in the m second time slices, there is a third guard interval between the adjacent second time slices.

Optionally, in an uplink random access and beam training procedure, the first sub-period includes b adjacent first time slice sets; each first time slice set includes $n_b$ first time slices; for each first time slice set, uplink access signals are received by using $n_b$ receive beams; and b and $n_b$ are positive integers.

Optionally, the second procedure includes an uplink data transmission procedure; and m is a quantity of receive beams used in uplink data transmission.

Optionally, if uplink data is received by using different receive beams in adjacent second time slices in the m second time slices, there is a fourth guard interval between the adjacent second time slices.

In a possible implementation, some or all of the n first time slices are nonadjacent to each other.

Optionally, the first procedure includes a downlink synchronization and beam training procedure; the first sub-period includes c nonadjacent first time slice sets; each first time slice set includes $n_c$ adjacent first time slices; for each first time slice set, downlink synchronization signals are sent by using $n_c$ transmit beams; and c and $n_c$ are positive integers.

Optionally, there are c second procedures; each second procedure is a downlink data transmission procedure; and m is a quantity of transmit beams used in downlink data transmission.

Optionally, if downlink data is sent by using different transmit beams in adjacent second time slices in the m second time slices, there is a fifth guard interval between the adjacent second time slices.

Optionally, the first procedure includes an uplink random access and beam training procedure; an n first time slice includes d nonadjacent first time slice sets; each first time slice set includes $n_d$ adjacent first time slices; for each first time slice set, uplink access signals are received by using $n_d$ receive beams; and d and $n_d$ are positive integers.

Optionally, the second procedure includes an uplink data transmission procedure, and m is a quantity of receive beams used in uplink data transmission.

Optionally, if uplink data is received by using different receive beams in adjacent second time slices in the m second time slices, there is a sixth guard interval between the adjacent second time slices.

According to a second aspect, an embodiment of the present application provides a communications apparatus, including:

a processing unit, configured to determine a radio frame, where the radio frame includes a period, the period includes at least one first sub-period and at least one second sub-period, the first sub-period corresponds to a first procedure, and the second sub-period corresponds to a second procedure; the first sub-period includes n first time slices, different beams are used in adjacent first time slices in the n first time slices, there is a first guard interval between the adjacent first time slices, and the second sub-period includes m second time slices; each first time slice includes at least one symbol and each second time slice includes at least one symbol; at least one first time slice is adjacent to at least one second time slice and there is no guard interval between the at least one first time slice and the at least one second time slice that are adjacent to each other; and m and n are positive integers; and a communications unit, configured to perform communication by using the radio frame.

Optionally, a same beam is used in the first time slice and the second time slice that are adjacent to each other.

Optionally, all of the n first time slices are adjacent to each other.

Optionally, the first procedure is a downlink synchronization and beam training procedure; the first sub-period includes x adjacent first time slice sets; each first time slice set includes $n_a$ first time slices; and for each first time slice set, downlink synchronization signals are sent by using $n_a$ transmit beams.

Optionally, the second procedure includes a downlink data transmission procedure; and m is a quantity of transmit beams used in downlink data transmission.

Optionally, if downlink data is sent by using different transmit beams in adjacent second time slices in the m second time slices, there is a third guard interval between the adjacent second time slices.

Optionally, the first procedure is an uplink random access and beam training procedure; the first sub-period includes b adjacent first time slice sets; each first time slice set includes $n_b$ first time slices; for each first time slice set, uplink access signals are received by using $n_b$ receive beams; and b and $n_b$ are positive integers.

Optionally, the second procedure includes an uplink data transmission procedure; and m is a quantity of receive beams used in uplink data transmission.

Optionally, if uplink data is received by using different receive beams in adjacent second time slices in the m second time slices, there is a fourth guard interval between the adjacent second time slices.

Optionally, some or all of the n first time slices are nonadjacent to each other.

Optionally, the first procedure includes a downlink synchronization and beam training procedure; the first sub-period includes c nonadjacent first time slice sets; each first time slice set includes $n_c$ adjacent first time slices; for each first time slice set, downlink synchronization signals are sent by using $n_c$ transmit beams; and c and $n_c$ are positive integers.

Optionally, there are c second procedures; each second procedure is a downlink data transmission procedure; and m is a quantity of transmit beams used in downlink data transmission.

Optionally, if downlink data is sent by using different transmit beams in adjacent second time slices in the m second time slices, there is a fifth guard interval between the adjacent second time slices.

Optionally, the first procedure includes an uplink random access and beam training procedure; the n first time slice includes d nonadjacent first time slice sets; each first time slice set includes $n_d$ adjacent first time slices; for each first time slice set, uplink access signals are received by using $n_d$ receive beams; and d and $n_d$ are positive integers.

Optionally, the second procedure includes an uplink data transmission procedure; and m is a quantity of receive beams used in uplink data transmission.

Optionally, if uplink data is received by using different receive beams in adjacent second time slices in the m second time slices, there is a sixth guard interval between the adjacent second time slices.

In the embodiments of the present application, for a frame structure design, a guard interval for beam switching between two procedures is saved, thereby reducing beam switching overheads, and improving resource utilization efficiency.

BRIEF DESCRIPTION OF DRAWINGS

The accompanying drawings are included in the specification and form a part of the specification. Same elements are drawn by using same numerals. The accompanying drawings are intended to describe the embodiments of the present application, and the accompanying drawings together with the described content are intended to explain a principle of the present application.

DESCRIPTION OF EMBODIMENTS

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

Figure 1:
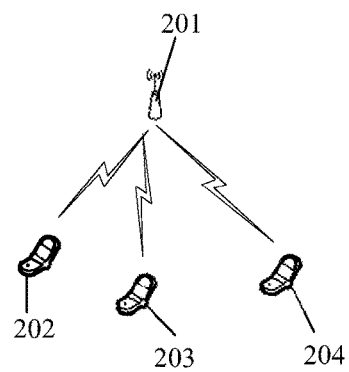
FIG. 1 is a schematic architectural diagram of a communications system to which an embodiment of the present application is applied.

FIG. 1 is a schematic architectural diagram of a communications system to which an embodiment of the present application is applied. As shown in FIG. 1, the communications system 200 may include terminal devices 202 to 204 and a network device 201 that are connected in a wireless manner, in a wired manner, or in another manner. A network device may support a plurality of access technologies, and provide a plurality of services to a terminal device by using the plurality of access technologies.

It should be understood that, the technical solutions of the embodiments of the present application may be applied to various communications systems, such as: a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a future 5G communications system, and the like.

The embodiments are described with reference to a terminal device in the present application. The terminal device may communicate with one or more core networks by using a radio access network (RAN). The terminal device may be user equipment (UE), an access terminal, a subscriber unit, a subscriber station, a mobile station, a mobile, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in a future 5G network, or the like.

The embodiments are described with reference to a network device in the present application. The network device may be a device configured to communicate with the terminal device, and may be, for example, a base transceiver station (BTS) in a GSM system or CDMA, a NodeB (NB) in a WCDMA system, or an evolved NodeB (eNB or eNodeB) in an LTE system; or the network device may be a relay station, an access point, an in-vehicle device, a wearable device, a network side device in a future 5G network, a network device in a future evolved PLMN network, or the like.

In a high-frequency system, to overcome a coverage problem caused by a limitation of a beam width of a directional beam, in a lot of procedures such as a synchronization procedure, a random access procedure, a signaling control procedure, a data transmission procedure, and a beam training procedure, all or some of beam groups need to be traversed. A guard interval required for a beam switching operation leads to a large quantity of overheads of a system. In addition, when all or some of beams are traversed, execution orders of respective beam switching of two adjacent procedures are independently designed. Due to such a design, a guard interval for beam switching needs to be set between the two procedures. However, overheads of this part are continuously accumulated when procedures of the system are alternately performed, and cannot be underestimated especially when a procedure uses a distributed design. Therefore, to reduce beam switching overheads, execution orders of beam switching when beam switching is respectively performed in the two adjacent procedures are designed in a combined manner, and a beam used by the last symbol in a previous procedure is made the same as a beam used by the first symbol in a next procedure. Therefore, for a frame structure design, a guard interval for beam switching is saved between two procedures, thereby reducing beam switching overheads and improving resource utilization efficiency.

An embodiment of the present application provides a special radio frame. The radio frame includes a period. The period includes at least one first sub-period and at least one second sub-period. The first sub-period corresponds to a first procedure. The second sub-period corresponds to a second procedure. The first sub-period includes n first time slices. Different beams are used in adjacent first time slices in the m first time slices. There is a first guard interval between the adjacent first time slices. The second sub-period includes m second time slices. Each first time slice includes at least one symbol. Each second time slice includes at least one symbol. At least one first time slice is adjacent to at least one second time slice. A second guard interval between the at least one first time slice and the at least one second time slice that are adjacent to each other is 0. m and n are positive integers.

Each of the first procedure and the second procedure is any one of the following procedures: a synchronization procedure, a random access procedure, a signaling control procedure, a data transmission procedure, a beam training procedure, or the like.

In this embodiment of the present application, signals are sent by using a same beam in the first time slice and the second time slice that are adjacent to each other.

Different sub-periods may correspond to different procedures, or may be used to transmit different channel signals.

Optionally, in the special radio frame, different beams are used in adjacent second time slices in the n second time slices, and there is a third guard interval between the adjacent second time slices.

No signal is sent in a guard interval.

In this embodiment of the present application, the special radio frame may be classified into a centralized radio frame or a distributed radio frame.

A centralized radio frame means that all of the m first time slices are adjacent to each other, and all of the n second time slices are adjacent to each other. A distributed radio frame means that some or all of the first time slices are nonadjacent to each other, or some or all of the second time slices are nonadjacent to each other, or some or all of the first time slices are nonadjacent to each other and some or all of the second time slices are nonadjacent to each other. In the distributed frame, a procedure is divided into K sub-procedures in a time domain for execution.

Figure 2:
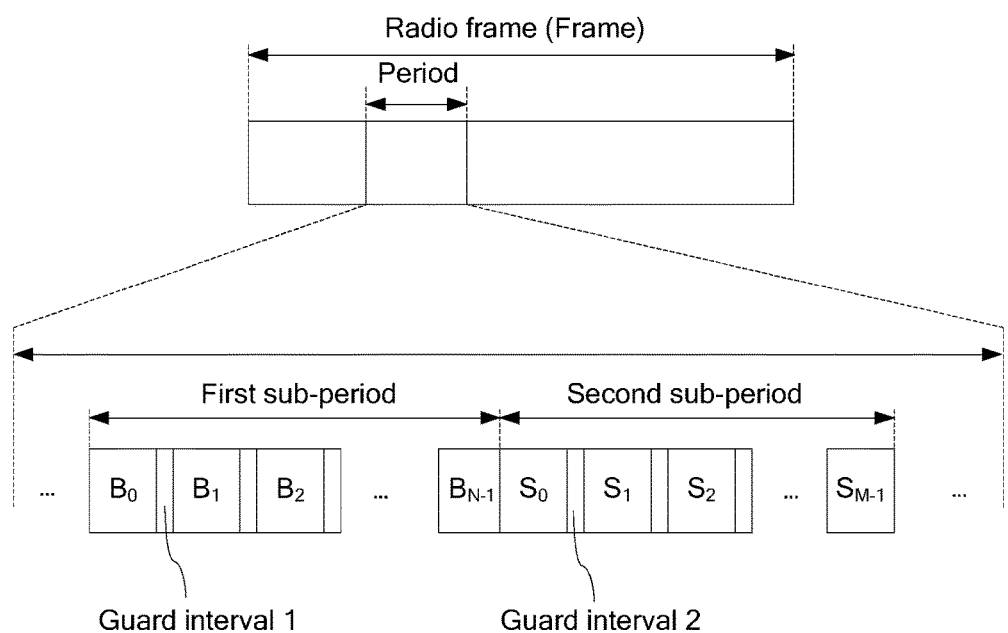
FIG. 2 is a schematic diagram of a frame structure according to an embodiment of the present application.

FIG. 2 is a schematic diagram of a frame structure according to an embodiment of the present application. The frame structure is a schematic structural diagram of a centralized radio frame. The frame includes a period. The period includes at least one first sub-period and at least one second sub-period. A procedure 1 corresponds to the first sub-period, and a procedure 2 corresponds to the second sub-period. The first sub-period includes n first time slices, for example, first time slices $B_0$ to $B_{N-1}$ in FIG. 2. The second sub-period includes m first time slices, for example, second time slices $S_0$ to $S_{M-1}$ in FIG. 2. In the figure, a plurality of first time slices and a plurality of second time slices are separately shown. Actually, there may be only one first time slice, or there may be only one second time slice. No guard interval between a first time slice and a second time slice that are adjacent to each other means that a guard interval between the first time slice and the second time slice that are adjacent to each other is 0. For example, in FIG. 2, there is no guard interval between a time slice $B_{N-1}$ and a time slice $S_0$. In this way, system overheads can be reduced, and resource utilization efficiency can be improved.

Signals may be transmitted by using a same beam in the first time slice and the second time slice that are adjacent to each other.

If there are a plurality of first time slices, signals may be transmitted by using different beams in adjacent first time slices, and there are guard intervals 1 between the adjacent first time slices. The guard intervals 1 between the adjacent first time slices may be the same or may be different. If there are a plurality of second time slices, signals may also be transmitted by using different beams in adjacent second time slices, and there may be guard intervals 2 between the adjacent second time slices. The guard intervals 2 between the adjacent second time slices may be the same or may be different.

Figure 3:
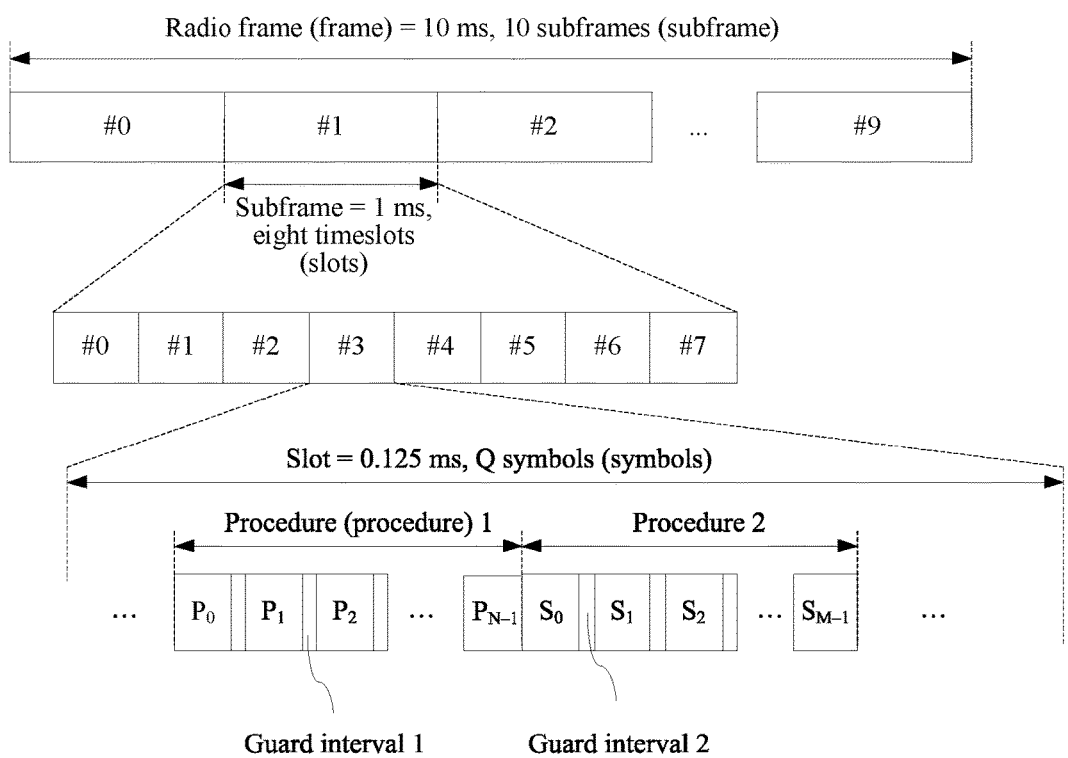
FIG. 3 is another schematic diagram of a frame structure according to an embodiment of the present application.

FIG. 3 is another schematic diagram of a frame structure according to an embodiment of the present application. The frame structure is also a centralized frame structure. The frame structure shown in FIG. 3 may be considered as a special case of the frame structure shown in FIG. 2. In FIG. 3, a frame length of a radio frame is 10 ms. A radio frame includes 10 radio subframes of which each has a frame length of 1 millisecond. A radio subframe is divided into eight timeslots (slot) of which each has a length of 0.125 millisecond. Each timeslot includes Q symbols. A symbol may be a single-carrier symbol, or may be a multi-carrier symbol such as an orthogonal frequency division multiplexing (OFDM) symbol. A value of Q is determined by a specific system operating frequency band. For systems of 72 GHz, 28 GHz, and 14 GHz, typical values of Q may be 80, 40, and 20 respectively. A length of the radio frame, a length of the subframe, a length of the symbol, a quantity of subframes included in each radio frame, and a quantity of timeslots included in each subframe may also be other values, and values listed herein are examples. For other related content, refer to corresponding related descriptions in FIG. 1.

In FIG. 3 in this embodiment of the present application, a period is a period in one timeslot, and the period is divided into several time slices (Slides). The period includes at least one first sub-period and at least one second sub-period. In the period, there are two consecutive procedures 1 and 2. The procedure 1 corresponds to the first sub-period, and the procedure 2 corresponds to the second sub-period. In adjacent time slices, a base station may send signals by using different transmit beams, or may receive signals by using different receive beams. For example, a synchronization signal is sent by using a transmit beam #0 in a time slice $P_0$, and a data signal is received by using a receive beam #1 in a time slice $S_1$. A length of the time slice may be one symbol or may be a plurality of (>2) symbols.

Figure 4:
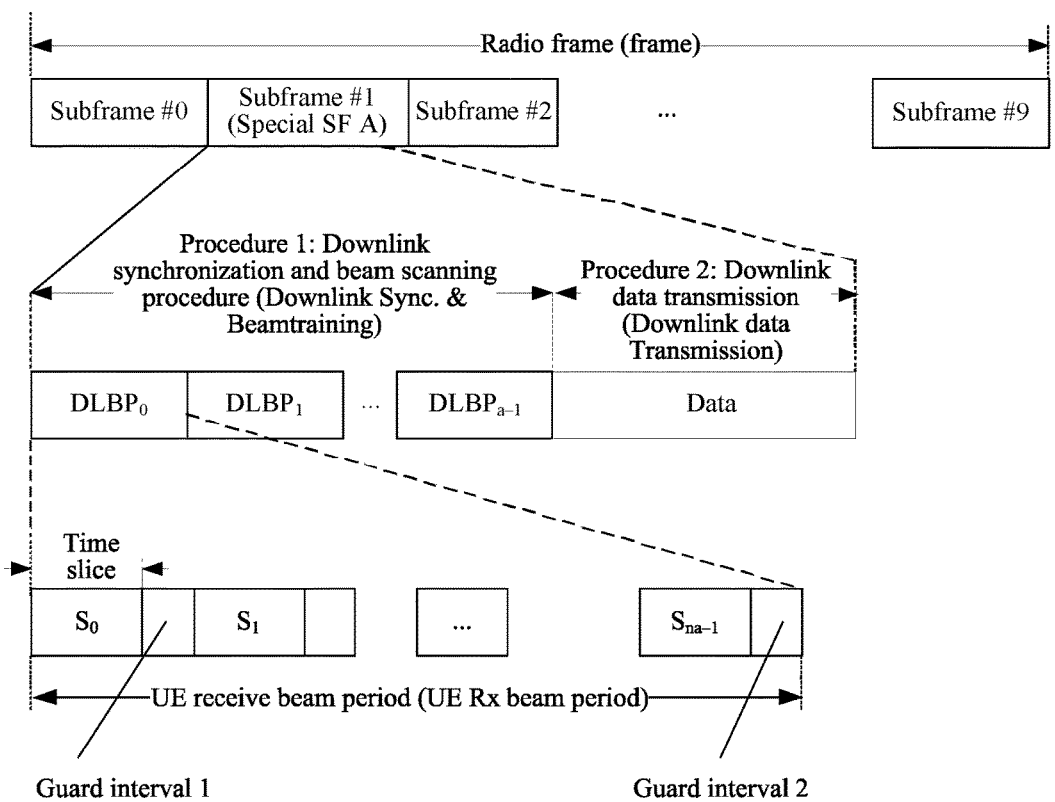
FIG. 4 is another schematic diagram of a frame structure according to an embodiment of the present application.

FIG. 4 is another schematic diagram of a frame structure according to an embodiment of the present application. A frame shown in FIG. 4 may be applied to a downlink synchronization and beam scanning procedure (Downlink Sync. & Beam training procedure) and a downlink data transmission procedure (Downlink data Transmission).

In the radio frame shown in FIG. 4, it is assumed that a frame length of a radio frame (frame) is 10 ms. A radio frame includes 10 radio subframes of which each has a frame length of 1 millisecond. The length of the radio frame and the length of the subframe may also be other values, and values listed herein are examples. For other related content, refer to corresponding related descriptions in FIG. 1.

Radio subframes may include a normal subframe and a special subframe. The special subframe is mainly used in a downlink synchronization and beam training procedure and a downlink data transmission procedure. For example, the special subframe is a subframe #1 in FIG. 4. The period is a subframe, for example, the subframe #1, and the period is divided into several time slices. The period includes at least one first sub-period and at least one second sub-period. The at least one first sub-period and the at least one second sub-period respectively correspond to two procedures 1 and 2. The procedure 1 is a downlink synchronization and beam training procedure, and the procedure 2 is a downlink data transmission procedure. There is no guard interval between a first time slice and a second time slice that are adjacent to each other in the procedure 1 and the procedure 2. That is, a guard interval between the first time slice and the second time slice that are adjacent to each other is 0. For example, in FIG. 4, there is no guard interval between the last time slice in a downlink beam training period $DLBP_{a-1}$ and the first time slice in the procedure 2. In this way, system overheads can be reduced, and resource utilization efficiency can be improved. A sequenced relationship between the procedure 1 and the procedure 2 is not limited in this embodiment of the present application. A sequence of the procedures shown in FIG. 4 is merely an example.

Signals may be transmitted by using a same beam in the first time slice and the second time slice that are adjacent to each other.

The first sub-period includes n time slices. A value of n is determined by a quantity of transmit beams required in downlink synchronization. A base station sends a system downlink synchronization signal by using a transmit beam in each time slice. The first sub-period includes x adjacent first time slice sets, for example, a $DLBP_0$ to the $DLBP_{a-1}$ in FIG. 4. Each first time slice set may be referred to as a DLBP (downlink beam training period) sub-period. The base station may traverse all transmit beams in a DLBP sub-period, and sequentially send system synchronization signals by using different beams. There may be a guard interval between every two first time slice sets, for example, a guard interval 2 in the figure. Guard intervals 1 may be the same or may be different. A value of a is determined by a frequency band used by a high-frequency communications system. For systems of 72 GHz, 28 GHz, and 14 GHz, typical values of a may be respectively 12, 8, and 6.

Each first time slice set may include $n_a$ first time slices, for example, the $DLBP_0$ includes a time slice $S_0$ to a time slice $S_{na-1}$. Quantities of first time slices included in the first time slice sets may be the same or may be different. There is a guard interval between adjacent first time slices in each first time slice set, for example, the guard interval 1 in the figure. Guard intervals 1 may be the same or may be different. The guard intervals 1 and 2 may be the same or may be different. For each first time slice set, downlink synchronization signals may be sent by using $n_a$ transmit beams. A value of $n_a$ is determined by a frequency band used by a high-frequency communications system. For systems of 72 GHz, 28 GHz, and 14 GHz, typical values of $n_a$ may be respectively 16, 12, and 8. Transmit beams used in adjacent time slices in a same time slice set may be different. Transmit beams used in different time slice sets may be the same or may be different. For example, in each time slice, the base station may send a synchronization signal by using a different transmit beam. For example, a synchronization signal is sent by using a transmit beam #0 in a time slice S0, and a synchronization signal is sent by using a transmit beam #1 in a time slice S1. A guard interval for beam switching is reserved after each time slice, for switching between different transmit beams. A length of the first time slice may be two symbols, where a symbol is used to send a primary synchronization signal, and the other symbol is used to send a secondary synchronization signal. Alternatively, a length of the first time slice may be more than two symbols, where at least one symbol is used to send a primary synchronization signal, and another symbol is used to send a secondary synchronization signal.

A DLBP sub-period may correspond to a receive beam period of a terminal device. In a DLBP sub-period, the terminal device receives a synchronization signal by using a fixed receive beam. In different DLBP sub-periods, the terminal device receives synchronization signals by switching different receive beams. In a special subframe, switching of at most x receive beams by the terminal device is supported.

The procedure 2 is divided into m second time slices. A value of m is determined by a quantity of transmit beams used in current downlink data transmission. If the procedure 2 is used only for downlink data transmission of a single user, the value of m is 1. When m is greater than 1, signals may be transmitted by using different beams in adjacent second time slices. There may be a guard interval between the adjacent second time slices. The guard interval is not shown in FIG. 4. Guard intervals between the adjacent second time slices may be the same or may be different.

Figure 5:
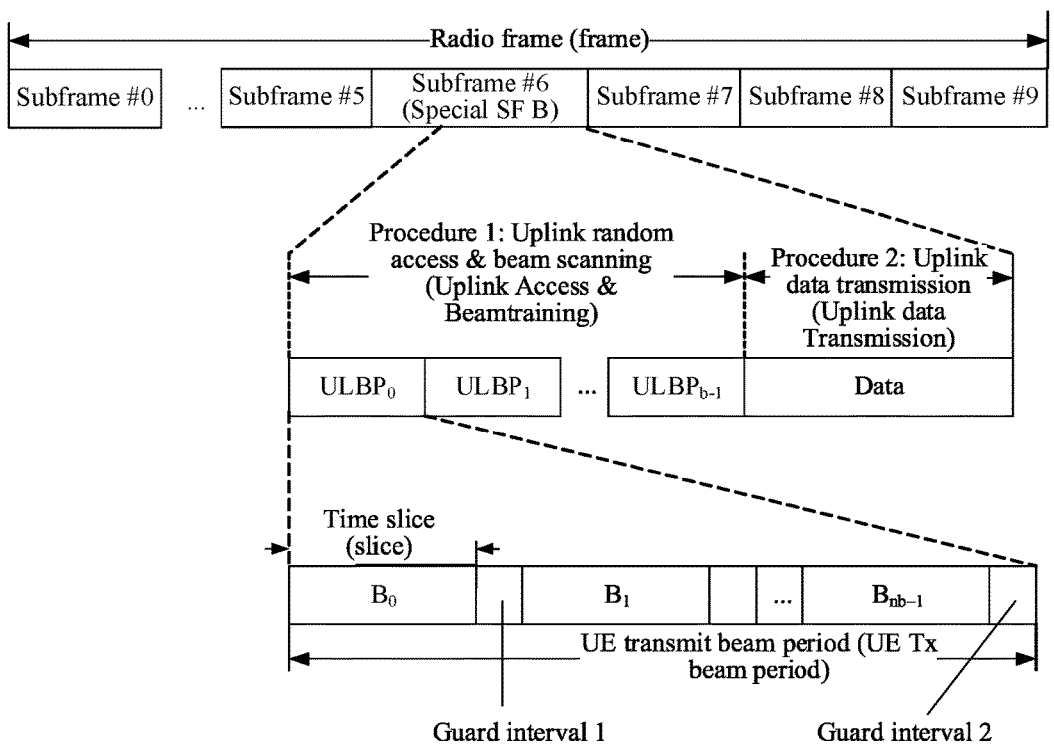
FIG. 5 is another schematic diagram of a frame structure according to an embodiment of the present application.

FIG. 5 is another schematic diagram of a frame structure according to an embodiment of the present application. A frame shown in FIG. 5 may be applied to an uplink random access and beam training (Uplink Access & Beam training) procedure and an uplink data transmission procedure.

A difference between the frame shown in FIG. 5 and the frame shown in FIG. 4 lies in that: a special subframe in FIG. 5 is mainly used in an uplink random access and beam training (Uplink Access & Beam training) procedure and an uplink data transmission procedure. A procedure 1 is the uplink random access and beam training procedure, and a procedure 2 is the uplink data transmission procedure. A first sub-period corresponds to the procedure 1, and a second sub-period corresponds to the procedure 2. There is no guard interval between a first time slice and a second time slice that are adjacent to each other. For example, in FIG. 5, there is no guard interval between the last first time slice in a uplink beam training period (ULBP) $ULBP_{b-1}$ and the $1^{st}$ second time slice in the second procedure. The first sub-period includes b adjacent first time slice sets, for example, a $ULBP_0$ to the $ULBP_{b-1}$ in FIG. 5. Each first time slice set may be referred to as a uplink beam training period (ULBP) sub-period. Each first time slice set may include $n_b$ first time slices. For example, the $ULBP_0$ includes a time slice $B_0$ to a time slice $B_{nb-1}$. In a ULBP, a base station may traverse all receive beams in a ULBP sub-period, and sequentially receive, by using different beams, uplink access signals sent by a terminal device. In each first time slice, the base station may receive, by using a different receive beam, an uplink access signal sent by the terminal device. A ULBP sub-period may correspond to a transmit beam period of the terminal device. The terminal device sends an uplink access signal by using a fixed transmit beam in a ULBP sub-period. In different ULBP sub-periods, the terminal device sends uplink access signals by switching different transmit beams. In a special subframe, switching of at most b transmit beams by user equipment is supported. A value of b is predetermined during a system design, and a typical value of b may be 2.

The procedure 2 is divided into m second time slices. A value of m is determined by a quantity of receive beams used in current uplink data transmission. If the procedure 2 is used only for uplink data transmission of a single user, the value of m is 1. The frame shown in FIG. 5 is similar to the frame structure shown in FIG. 4. For specific content, refer to corresponding descriptions in FIG. 4, and details are not described herein again.

Figure 6:
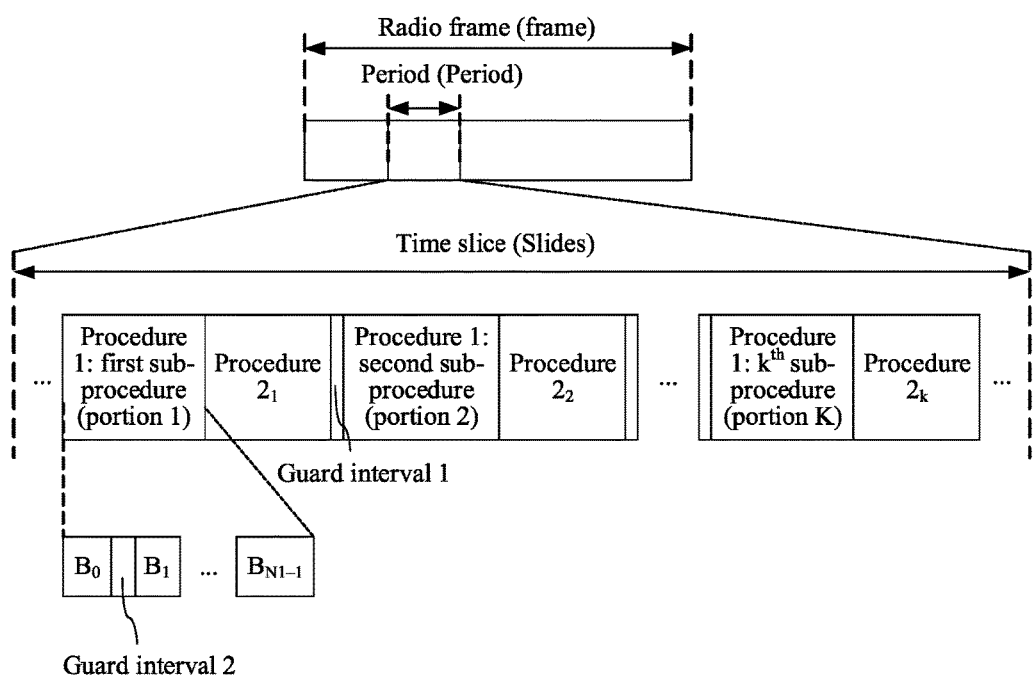
FIG. 6 is another schematic diagram of a frame structure according to an embodiment of the present application.

FIG. 6 is another schematic diagram of a frame structure according to an embodiment of the present application. The frame structure is a schematic structural diagram of a distributed radio frame. The period includes at least one first sub-period. The first sub-period corresponds to a procedure 1. The period further includes a second sub-period. Each second sub-period corresponds to a procedure 2. The first sub-period includes n time slices. The first period includes k first time slice sets. K is greater than 2. There are at least two nonadjacent first time slice sets in the k first time slice sets. The procedure 1 includes k sub-procedures. Each sub-procedure corresponds to a first time slice set. Each first time slice set includes $N_k$ adjacent first time slices. For example, the $1^{st}$ first time slice set includes $N_1$ time slices. There is a guard interval 2 between adjacent first time slices. Guard intervals 2 may be the same or may be different. Quantities of first time slices included in the first time slice sets may be the same or may be different. $N_k$ may be equal to 1. For each first time slice set, signals are transmitted by using $N_k$ beams. Signals may be transmitted by using different beams in adjacent first time slices.

The second sub-period includes k procedures 2. Each second procedure includes m second time slices. If m is greater than or equal to 2, signals are transmitted by using different beams in adjacent second time slices in the m second time slices. There is a guard interval between the adjacent second time slices. The guard intervals may be the same or may be different. The k procedures 2 in FIG. 6 may be same procedures or may be different procedures. Alternatively, the k procedures 2 may be considered as k sub-procedures 2 of one procedure 2. For example, a procedure 2$_1$ and a procedure 2$_2$ in FIG. 6 may be the same or may be different.

Figure 7:
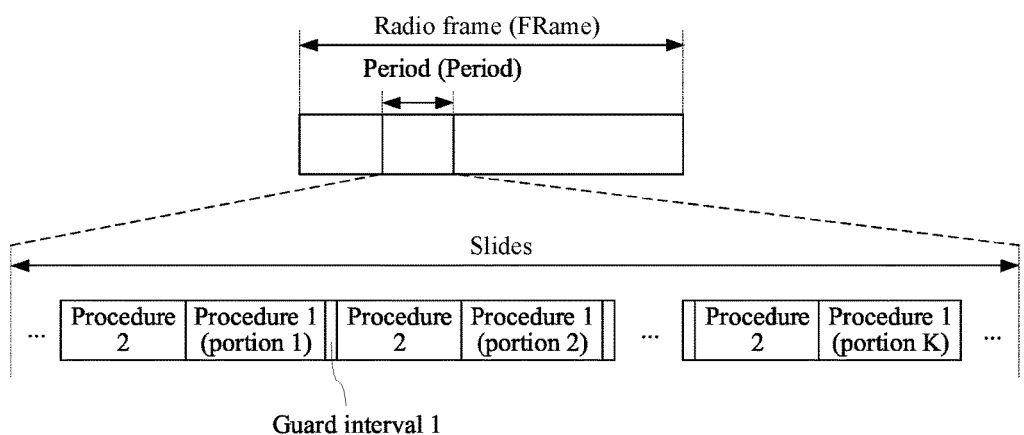
FIG. 7 is another schematic diagram of a frame structure according to an embodiment of the present application.
Figure 8:
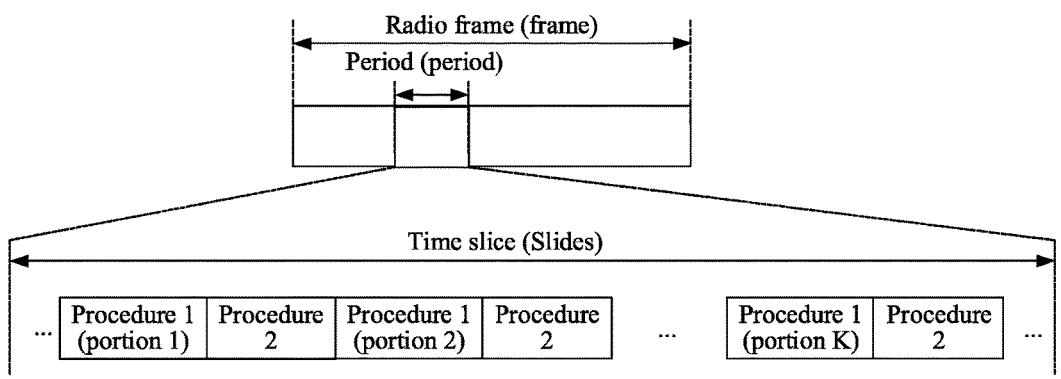
FIG. 8 is another schematic diagram of a frame structure according to an embodiment of the present application.

There is no guard interval between at least one first time slice and at least one second time slice that are adjacent to each other, or a guard interval is 0. In FIG. 6, for example, the last first time slice in the first sub-procedure 1 is adjacent to the 1$^{st}$ second time slice in the first procedure 2, and there is no guard interval therebetween. However, the 1$^{st}$ first time slice in a second sub-procedure 1 is adjacent to the last second time slice in the first procedure 2, and there is a guard interval 1 therebetween. That is, when the last first time slice in each sub-procedure 1 is adjacent to a second time slice in the procedure 2, there may be no guard interval between the first time slice and the second time slice that are adjacent to each other. Alternatively, as shown in FIG. 7, when the 1$^{st}$ first time slice in each sub-procedure 1 is adjacent to a second time slice in the procedure 2, there may be no guard interval between the first time slice and the second time slice that are adjacent to each other. Alternatively, as shown in FIG. 8, there is no guard interval between all first time slices and second time slices that are adjacent to each other. In the frame structures shown in FIG. 6 to FIG. 8, a difference is whether there is a guard interval between a first time slice and a second time slice that are adjacent to each other, and except that, other parts of the frame structures are the same. Details are not described herein. No guard interval between a first time slice and a second time slice that are adjacent to each other means that a guard interval between the first time slice and the second time slice that are adjacent to each other is 0. In this way, system overheads can be reduced, and resource utilization efficiency can be improved.

Signals may be transmitted by using a same beam in the first time slice and the second time slice that are adjacent to each other.

Figure 9:
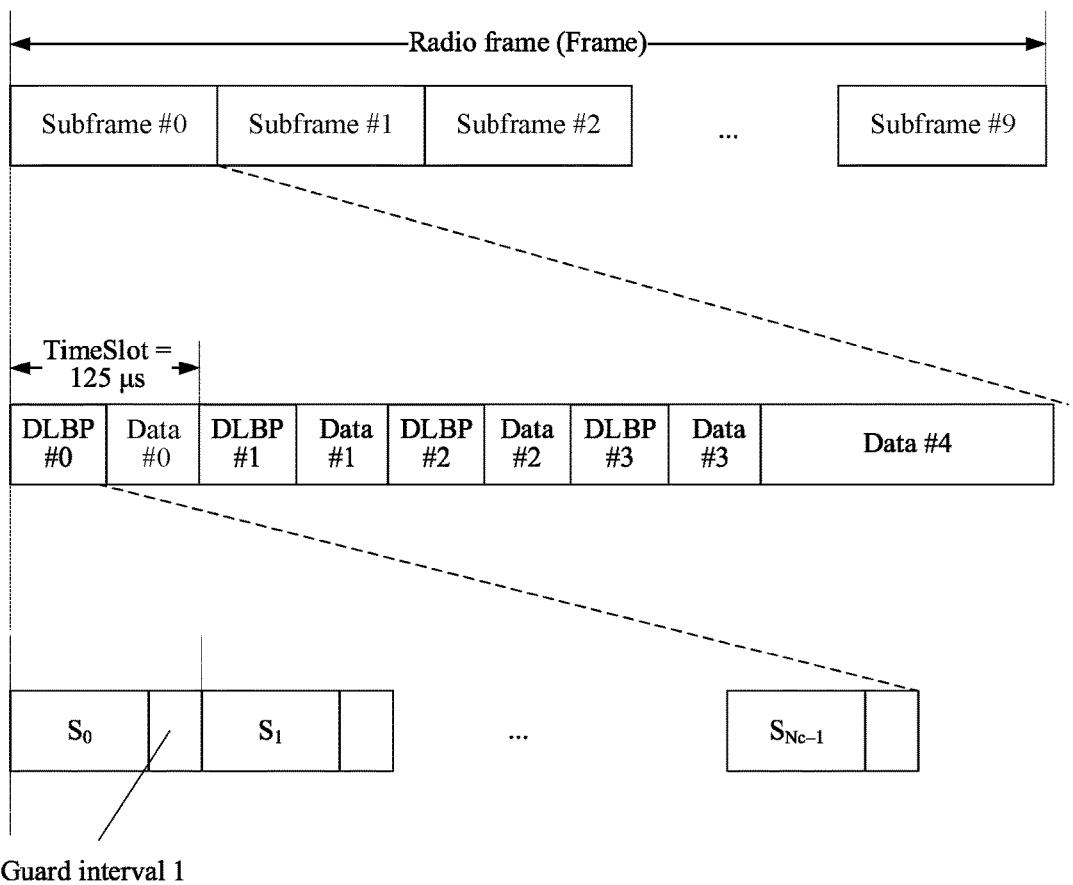
FIG. 9 is another schematic diagram of a frame structure according to an embodiment of the present application.

FIG. 9 is another schematic diagram of a frame structure according to an embodiment of the present application. The frame structure is a schematic structural diagram of a distributed radio frame. The frame structure may be applied to a downlink synchronization and beam scanning procedure (Downlink Sync. & Beam training procedure) and a downlink data transmission procedure.

In the radio frame shown in FIG. 9, it is assumed that a frame length of a radio frame is 10 ms. A radio frame includes 10 radio subframes of which each has a frame length of 1 millisecond.

Radio subframes may include a normal subframe and a special subframe. The special subframe is mainly used in a downlink synchronization and beam training procedure and a downlink data transmission procedure. For example, a subframe #0, a subframe #1, and a subframe #2 in FIG. 9 may be used in the downlink synchronization and beam training procedure and the downlink data transmission procedure. A period includes a plurality of subframes, for example, the subframe #0, the subframe #1, and the subframe #2 in FIG. 9. Alternatively, a period may include a subframe. FIG. 9 is merely an example. The period is divided into several time slices. The period includes at least one first sub-period and at least one second sub-period. The at least one first sub-period and the at least one second sub-period respectively correspond to two procedures: procedures 1 and 2. The procedure 1 is a downlink synchronization and beam training procedure, and the procedure 2 is a downlink data transmission procedure. For example, in FIG. 9, the procedure 1 is a procedure corresponding to all DLBPs (downlink beam training period) in the subframe #0 to the subframe #2. The procedure 2 is a procedure corresponding to data periods in the subframe #0 to the subframe #2, for example, data #0 in FIG. 9. There is no guard interval between a first time slice and a second time slice that are adjacent to each other in the procedure 1 and the procedure 2. For example, in FIG. 9, there is no guard interval between the last first time slice in each DLBP and the 1$^{st}$ second time slice in a data period. That is, a guard interval between the first time slice and the second time slice that are adjacent to each other is 0. In this way, system overheads can be reduced, and resource utilization efficiency can be improved. A sequenced relationship between the procedure 1 and the procedure 2 is not limited in this embodiment of the present application. A sequence of the procedures shown in FIG. 9 is merely an example. Signals may be transmitted by using a same beam in the first time slice and the second time slice that are adjacent to each other.

The first sub-period includes n time slices. A value of n is determined by a quantity of transmit beams required in uplink synchronization. A base station sends a system downlink synchronization signal by using a transmit beam in each time slice. The first sub-period includes c first time slice sets. There are at least two nonadjacent first period sets in the c first time slice sets. Each first time slice set may be referred to as a DLBP (downlink beam training period) sub-period. For example, in FIG. 9, there are 12 DLBPs in total, that is, a DLBP #0 to a DLBP #3 of the first four timeslots (slots) in the subframe #0, and DLBPs of the first four timeslots (slots) in the subframe #1 and the subframe #2 (the DLBPs in the subframe #1 and the subframe #2 are similar to the DLBPs in the subframe #0, and are not shown in the figure). The 12 DLBPs are merely an example, and there may be another quantity of DLBPs. Quantities of DLBPs in different subframes may also be different. In FIG. 9, all DLBPs are nonadjacent to each other. In FIG. 9, distribution of the DLBPs is merely an example, and another distribution manner may alternatively be used. This is not limited in this embodiment of the present application, provided that there are at least two nonadjacent first period sets.

Each first time slice set may include $N_c$ first time slices, for example, the DLBP #0 includes a time slice $S_0$ to a time slice $S_{N_c-1}$. The base station may traverse all transmit beams in a DLBP sub-period, and sequentially send system synchronization signals by using different beams. A value of $N_c$ is related to a beam coverage width and an area to be covered by a system, and a typical value of Nc may be 9. Quantities of first time slices included in the first time slice sets may be the same or may be different. There is a guard interval between adjacent first time slices in each first time slice set, for example, a guard interval 1 in the figure. Guard intervals 1 may be the same or may be different. For each first time slice set, downlink synchronization signals may be sent by using $N_c$ transmit beams. Transmit beams used in adjacent time slices in a same time slice set may be different. Transmit beams used in different time slice sets may be the same or may be different. For example, in each time slice, the base station may send a synchronization signal by using a different transmit beam. For example, the base station may send a synchronization signal by using a transmit beam #0 in a time slice S0, and send a synchronization signal by using a transmit beam #1 in a time slice S1. A guard interval for beam switching is reserved after each time slice, for switching between different transmit beams. A length of the first time slice may be two symbols, where a symbol is used to send a primary synchronization signal, and the other symbol is used to send a secondary synchronization signal. Alternatively, a length of the first time slice may be more than two symbols, where at least one symbol is used to send a primary synchronization signal, and another symbol is used to send a secondary synchronization signal.

A DLBP sub-period may correspond to a receive beam period of a terminal device. In a DLBP sub-period, the terminal device receives a synchronization signal by using a fixed receive beam. In different DLBP sub-periods, the terminal device receives synchronization signals by switching different receive beams. In a radio frame, switching of at most c receive beams by user equipment is supported. A value of c is predetermined during a system design, and a typical value of c may be 12. For example, in FIG. 9, there are 12 receive beams.

The second sub-period includes c procedures 2. Each second procedure includes m second time slices. If m is greater than or equal to 2, signals are transmitted by using different beams in adjacent second time slices in the m second time slices. There is a guard interval between the adjacent second time slices. The guard intervals may be the same or may be different. The c procedures 2 may be a same procedure. For example, data #0 to data #4 in FIG. 9 are all used in transmission of data of a terminal device. Alternatively, the c procedures 2 may be different procedures. For example, data #0 to data #4 in FIG. 9 are used in transmission of data of different terminal devices. Alternatively, the c procedures 2 may be considered as c sub-procedures 2 of one procedure 2. For example, the data #0 to the data #4 in the figure are considered as five sub-procedures of one procedure 2. The guard intervals 2 between the adjacent second time slices may be the same or may be different. As shown in FIG. 9, in a timeslot of a DLBP sub-period, remaining frame resources that are not used in a DLBP may be considered as a procedure 2, and are used in downlink data transmission. These resources may be divided into m time slices. A value of m is determined by a quantity of transmit beams used in current downlink data transmission. A typical value of m may be 1, that is, all the remaining resources are allocated to an user for downlink data transmission. In FIG. 9, there is no guard interval between the first time slice in a DLBP and an adjacent second time slice for data transmission. In this way, system overheads can be reduced, and resource utilization efficiency can be improved.

Figure 10:
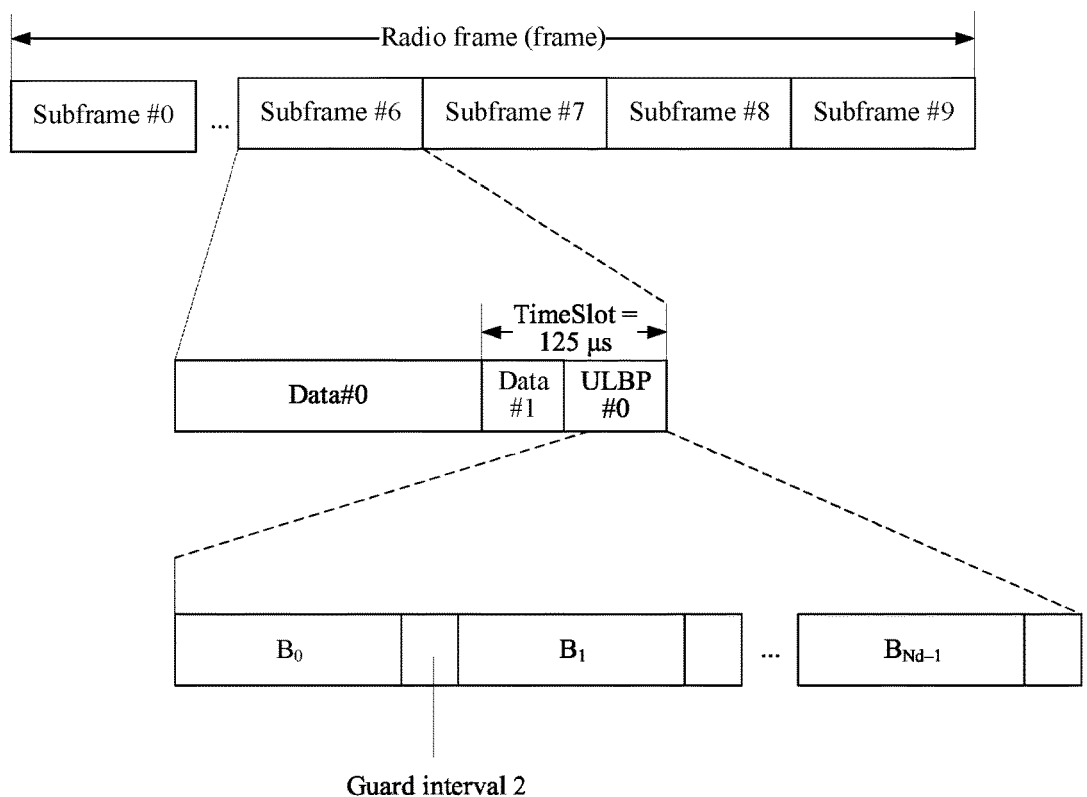
FIG. 10 is another schematic diagram of a frame structure according to an embodiment of the present application.

FIG. 10 is another schematic diagram of a frame structure according to an embodiment of the present application. The frame structure is a schematic structural diagram of a distributed radio frame. The frame structure may be applied to an uplink beam training & access procedure (UL beam training & access procedure) and an uplink data transmission procedure.

In the radio frame shown in FIG. 10, it is assumed that a frame length of a radio frame (frame) is 10 ms. A radio frame includes 10 radio subframes of which each has a frame length of 1 millisecond. For other related content, refer to corresponding related descriptions in FIG. 2.

Radio subframes may include a normal subframe and a special subframe. The special subframe is mainly used in an uplink beam training & access procedure and an uplink data transmission procedure. For example, a subframe #6 to a subframe #9 in FIG. 10 may be used in the uplink synchronization and beam training procedure and the uplink data transmission procedure. A period includes a plurality of subframes, for example, the subframe #6 to the subframe #9 in FIG. 10. Alternatively, a period may be a subframe. FIG. 10 is merely an example. The period is divided into several time slices. The period includes at least one first sub-period and at least one second sub-period. The at least one first sub-period and the at least one second sub-period respectively correspond to two procedures: procedures 1 and 2. The procedure 1 is an uplink beam training & access procedure, for example, a procedure corresponding to ULBPs (upLink beam training period) in the subframe #6 to the subframe #9 in FIG. 10. The procedure 2 is an uplink data transmission procedure, for example, a procedure corresponding to data periods in the subframe #6 to the subframe #9 in FIG. 9. There is no guard interval between a first time slice and a second time slice that are adjacent to each other in the procedure 1 and the procedure 2. For example, there is no guard interval between the last second time slice in data #0 and the $1^{st}$ first time slice in a ULBP #0. That is, a guard interval between the first time slice and the second time slice that are adjacent to each other is 0. In this way, system overheads can be reduced, and resource utilization efficiency can be improved. A sequenced relationship between the procedure 1 and the procedure 2 is not limited in this embodiment of the present application. A sequence of the procedures shown in FIG. 10 is merely an example. Signals may be transmitted by using a same beam in the first time slice and the second time slice that are adjacent to each other.

The first sub-period includes n time slices. The first sub-period includes d first time slice sets. There are at least two nonadjacent first period sets in the d first time slice sets. Each first time slice set may be referred to as a ULBP (upLink beam training period) sub-period. For example, in FIG. 10, there are four ULBPs in total, that is, a ULBP #0 of the last timeslot (slots) in the subframe #6, and ULBPs of the last timeslots (slots) in the subframe #7 to the subframe #9 (the ULBPs in the subframe #7 to the subframe #9 are similar, and are not shown in the figure). In FIG. 10, all ULBPs are nonadjacent to each other. In FIG. 10, distribution of the ULBPs is merely an example, and another distribution manner may alternatively be used. This is not limited in this embodiment of the present application, provided that there are at least two nonadjacent first period sets.

Each first time slice set may include $N_d$ first time slices. For example, a $ULBP_0$ includes a time slice $B_0$ to a time slice $B_{Nd-1}$. A base station may traverse all receive beams in a ULBP sub-period, and sequentially receive, by using different beams, uplink access signals sent by a user. A value of $N_d$ is related to a beam coverage width and an area to be covered by a system, and a typical value of $N_d$ may be 9. Quantities of first time slices included in the first time slice sets may be the same or may be different. There is a guard interval between adjacent first time slices in each first time slice set, for example, a guard interval 2 in the figure. Guard intervals 2 may be the same or may be different. For each first time slice set, uplink access signals sent by the user may be received by using $N_d$ receive beams. Receive beams used in adjacent time slices in a same time slice set may be different. Receive beams used in different time slice sets may be the same or may be different. For example, in each time slice, the base station may receive, by using a receive beam, an uplink access signal sent by the user. For example, an access signal is received by using a receive beam #0 in a time slice $B_0$, and an access signal is received by using a receive beam #1 in a time slice $B_1$. A guard interval for beam switching is reserved after each time slice, for switching between different receive beams. A length of the first time slice may be two symbols, where a symbol is used to send a primary synchronization signal, and the other symbol is used to send a secondary synchronization signal.

A ULBP sub-period may correspond to a transmit beam period of a terminal device. In a ULBP sub-period, the terminal device sends an uplink access signal by using a fixed transmit beam, that is, user equipment changes a transmit beam once in each timeslot. In different ULBP sub-periods, the terminal device sends uplink access signals by switching different transmit beams. In a radio frame, switching of at most d transmit beams by the user equipment is supported. A value of d is predetermined during a system design, and a typical value of d may be 4.

The second sub-period includes d procedures 2. Each second procedure includes m second time slices. If m is greater than or equal to 2, signals are transmitted by using different beams in adjacent second time slices in the m second time slices. There is a guard interval between the adjacent second time slices. The guard intervals may be the same or may be different. The d procedures 2 may be a same procedure. For example, data #0 and data #1 in FIG. 9 are both used in transmission of data of a terminal device. Alternatively, the d procedures 2 may be different procedures. For example, data #0 and data #1 in FIG. 9 are used in transmission of data of different terminal devices. Alternatively, the d procedures 2 may be considered as d sub-procedures 2 of one procedure 2. For example, the data #0 and the data #1 in the figure are considered as two sub-procedures of one procedure 2. The guard intervals 2 between adjacent second time slices may be the same or may be different. As shown in FIG. 10, in a timeslot of a ULBP sub-period, remaining frame resources that are not used in a ULBP may be considered as a procedure 2, and are used in uplink data transmission. These resources may be divided into m time slices. A value of m is determined by a quantity of transmit beams used in current uplink data transmission. A typical value of m may be 1, that is, all the remaining resources are allocated to an user for uplink data transmission. In FIG. 10, there is no guard interval between the first time slice in a ULBP and an adjacent second time slice for data transmission. In this way, system overheads can be reduced, and resource utilization efficiency can be improved.

Figure 11:
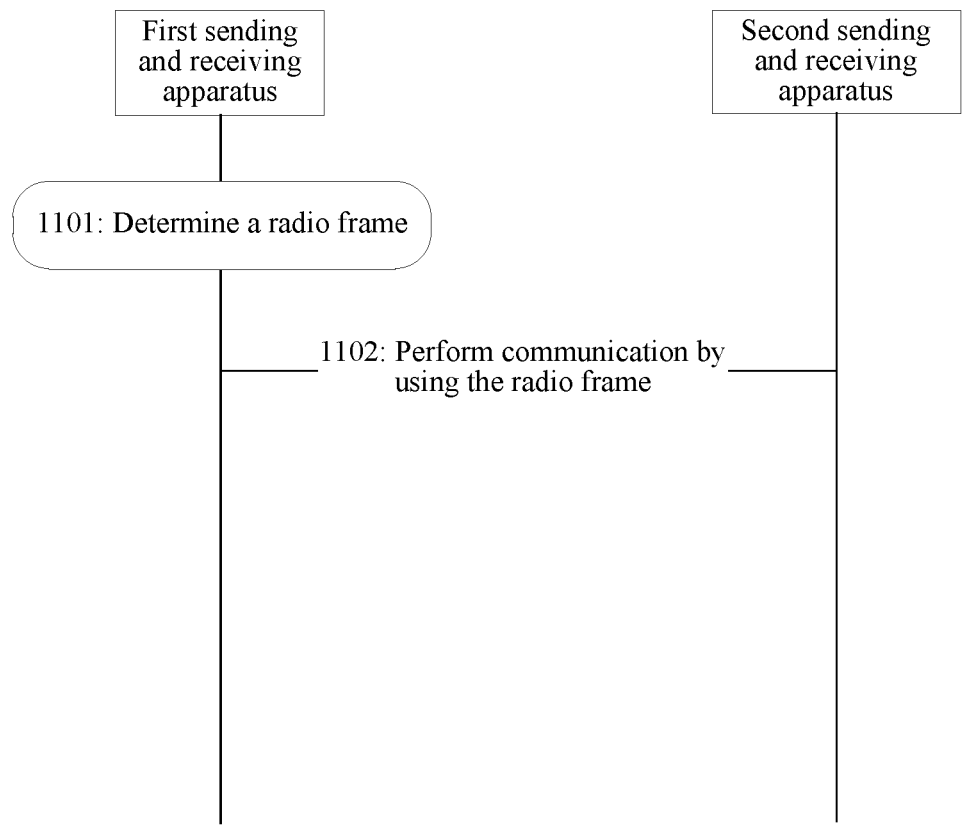
FIG. 11 is a schematic flowchart of a communications method according to an embodiment of the present application.

The frame structures used in the embodiments of the present application are described above. By means of the foregoing frame structures, an embodiment of the present application provides a communications method. FIG. 11 is a schematic flowchart of the communications method according to this embodiment of the present application. The method includes the following operations.

S1101: Determine a radio frame, where the radio frame includes a period, the period includes at least one first sub-period and at least one second sub-period, the first sub-period corresponds to a first procedure, and the second sub-period corresponds to a second procedure; the first sub-period includes n first time slices, different beams are used in adjacent first time slices in the n first time slices, there is a first guard interval between the adjacent first time slices, and the second sub-period includes m second time slices; each first time slice includes at least one symbol and each second time slice includes at least one symbol; at least one first time slice is adjacent to at least one second time slice and a second guard interval between the at least one first time slice and the at least one second time slice that are adjacent to each other is 0; and m and n are positive integers.

A communications apparatus may be a network device or may be a terminal device. For related descriptions of the network device and the terminal device, refer to corresponding descriptions in FIG. 1. Details are not described herein again.

The communications apparatus determines the radio frame used for communication. The radio frame used for communication may have the specific frame structures described above. Details are not described herein again. Refer to the foregoing descriptions.

S1102: Perform communication by using the radio frame.

During communication, a transceiver performs communication by using a same beam in the first time slice and the second time slice that are adjacent to each other.

For communication procedures, separately refer to the foregoing descriptions of corresponding frames. Details are not described herein again. In the frame that is used in the communications method in this embodiment of the present application, the second guard interval between the at least one first time slice and the at least one second time slice that are adjacent to each other is 0. In this way, system overheads can be reduced, and resource utilization efficiency can be improved.

Figure 12:
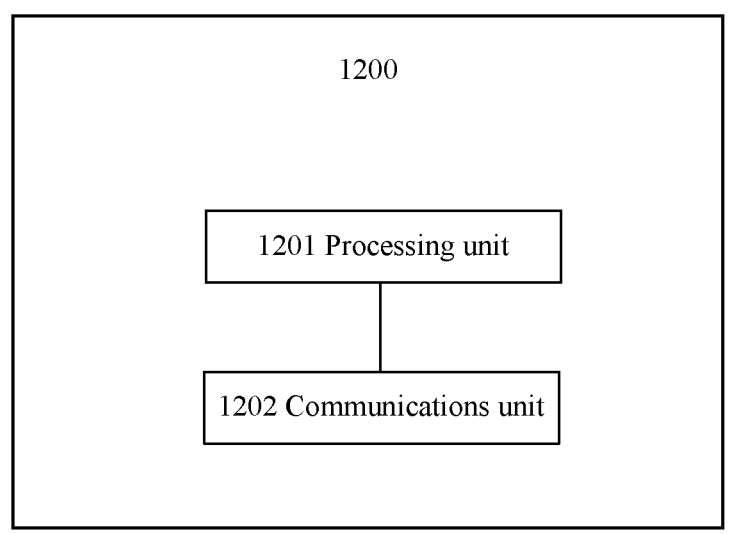
FIG. 12 is a schematic structural diagram of a communications apparatus according to an embodiment of the present application.

Based on a same idea, an embodiment of the present application provides a communications apparatus, configured to perform the method embodiment in the present application. For related content, refer to the descriptions of the method, and details are not described herein again. As shown in FIG. 12, the communications apparatus 1200 includes a processing unit 1201 and a communications unit 1202. The communications apparatus may be a network device or may be a terminal device. The processing unit may be a processor. The communications unit may be a transceiver. A receiving unit may be a receiver.

The processing unit is configured to determine a radio frame, where the radio frame includes a period, the period includes at least one first sub-period and at least one second sub-period, the first sub-period corresponds to a first procedure, and the second sub-period corresponds to a second procedure; the first sub-period includes n first time slices, different beams are used in adjacent first time slices in the n first time slices, there is a first guard interval between the adjacent first time slices, and the second sub-period includes m second time slices; each first time slice includes at least one symbol and each second time slice includes at least one symbol; at least one first time slice is adjacent to at least one second time slice and a second guard interval between the at least one first time slice and the at least one second time slice that are adjacent to each other is 0; and m and n are positive integers.

The communications unit is configured to perform communication by using the radio frame.

The processing unit determines the radio frame used for communication. The radio frame used for communication may have the frame structures described above. Details are not described herein again. Refer to the foregoing descriptions.

The communications unit performs communication by using a same beam in the first time slice and the second time slice that are adjacent to each other.

For communication procedures, separately refer to the foregoing descriptions of corresponding frames. Details are not described herein again. In the frame that is used in the communications method in this embodiment of the present application, the second guard interval between the at least one first time slice and the at least one second time slice that are adjacent to each other is 0. In this way, system overheads can be reduced, and resource utilization efficiency can be improved.

Figure 13:
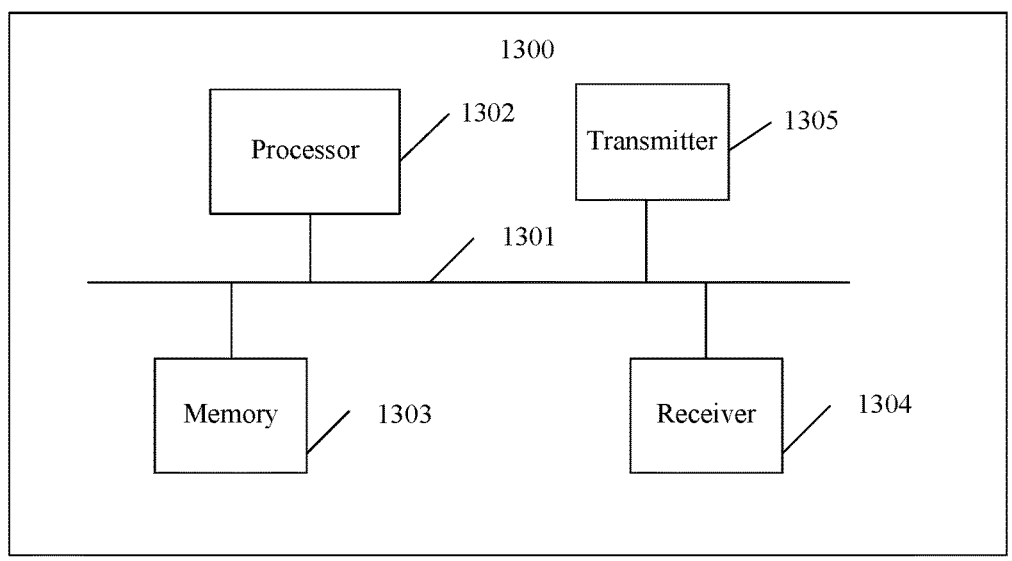
FIG. 13 is another schematic structural diagram of a communications apparatus according to an embodiment of the present application.

Based on a same technical idea, an embodiment of the present application provides a communications apparatus 1300, configured to perform the method in the embodiments of the present application. For related content, refer to the descriptions of the method, and details are not described herein again. Referring to FIG. 13, the communications apparatus 1300 includes a bus 1301, and a processor 1302, a memory 1303, a transmitter 1305, and a receiver 1304 that are separately connected to the bus 1301. The communications apparatus may be a network device or may be a terminal device.

The transmitter 1305 and the receiver 1304 are configured to communicate with a communications apparatus at a peer end.

The memory 1303 is configured to store an instruction.

The processor 1302 is configured to execute the instruction stored in the memory 1303, to perform the following operations when executing the instruction:

determining a radio frame, where the radio frame includes a period, the period includes at least one first sub-period and at least one second sub-period, the first sub-period corresponds to a first procedure, and the second sub-period corresponds to a second procedure; the first sub-period includes n first time slices, different beams are used in adjacent first time slices in the n first time slices, there is a first guard interval between the adjacent first time slices, and the second sub-period includes m second time slices; each first time slice includes at least one symbol and each second time slice includes at least one symbol; at least one first time slice is adjacent to at least one second time slice and a second guard interval between the at least one first time slice and the at least one second time slice that are adjacent to each other is 0; and m and n are positive integers; and instructing the transmitter 1305 and the receiver 1304 to communicate, by using the radio frame, with another communications apparatus.

In this embodiment of the present application, the radio frame used for communication is determined. The radio frame used for communication may have the frame structures described above. Details are not described herein again. Refer to the foregoing descriptions. When the transceiver 1304 communicates with the another communications apparatus by using the radio frame, the transceiver 1304 performs communication by using a same beam in the first time slice and the second time slice that are adjacent to each other.

For communication procedures, separately refer to the foregoing descriptions of corresponding frames. Details are not described herein again. In the frame that is used in the communications method in this embodiment of the present application, the second guard interval between the at least one first time slice and the at least one second time slice that are adjacent to each other is 0. In this way, system overheads can be reduced, and resource utilization efficiency can be improved.

It should be noted that the foregoing processor may be a processing unit or may be a collective name of a plurality of processing units. For example, the processor may be a central processing unit (CPU), or may be an application-specific integrated circuit (ASIC), or one or more integrated circuits configured to implement the embodiments of the present application, such as one or more microprocessors such as a digital signal processor, (DSP) or one or more field programmable gate arrays (FPGA).

The memory may be a storage apparatus, or may be a collective name of a plurality of storage elements; and the memory is configured to store executable program code or a parameter, data, and the like required for running of an access network device or a terminal of a resident. In addition, the memory may include a random access memory (RAM), and may also include a non-volatile memory (NVM), for example, a magnetic disk storage, or a flash memory (Flash).

The bus may be an industry standard architecture (ISA) bus, a peripheral component interconnect (PCI) bus, an Extended Industry Standard Architecture (EISA) bus, or the like. The bus may be classified into an address bus, a data bus, a control bus, or the like. For ease of representation, in the figure, the bus is represented by only one line, but it does not mean that there is only one bus or one type of bus.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

Although some embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

A person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A communications method, comprising:
determining a radio frame, wherein the radio frame comprises a period, the period comprises at least one first sub-period and at least one second sub-period, the first sub-period corresponds to a first procedure, and the second sub-period corresponds to a second procedure; the first sub-period comprises n first time slices, different beams are used in adjacent first time slices in the n first time slices, there is a first guard interval between the adjacent first time slices, and the second sub-period comprises m second time slices; each first time slice comprises at least one symbol and each second time slice comprises at least one symbol; at least one first time slice is adjacent to at least one second time slice, and there is no guard interval between the at least one first time slice and the at least one second time slice that are adjacent to each other; and m and n are positive integers; and
performing communication by using the radio frame.

2. The method according to claim 1, wherein a same beam is used in the first time slice and the second time slice that are adjacent to each other.

3. The method according to claim 1, wherein all of the n first time slices are adjacent to each other.

4. The method according to claim 3, wherein the first procedure is a downlink synchronization and beam training procedure, the first sub-period comprises x adjacent first time slice sets, each first time slice set comprises $n_a$ first time slices, and for each first time slice set, downlink synchronization signals are sent by using $n_a$ transmit beams.

5. The method according to claim 3, wherein the first procedure is an uplink random access and beam training procedure, the first sub-period comprises b adjacent first time slice sets, each first time slice set comprises $n_b$ first time slices, for each first time slice set, uplink access signals are received by using $n_b$ receive beams, and b and $n_b$ are positive integers.

6. The method according to claim 1, wherein some or all of the n first time slices are nonadjacent to each other.

7. The method according to claim 6, wherein the first procedure comprises a downlink synchronization and beam training procedure, the first sub-period comprises c nonadjacent first time slice sets, each first time slice set comprises $n_c$ adjacent first time slices, for each first time slice set, downlink synchronization signals are sent by using $n_c$ transmit beams, and c and $n_c$ are positive integers.

8. The method according to claim 6, wherein the first procedure comprises an uplink random access and beam training procedure, the n first time slice comprises d nonadjacent first time slice sets, each first time slice set comprises $n_d$ adjacent first time slices, for each first time slice set, uplink access signals are received by using $n_d$ receive beams, and d and $n_d$ are positive integers.

9. A communications apparatus, comprising:
a processing unit, configured to determine a radio frame, wherein the radio frame comprises a period, the period comprises at least one first sub-period and at least one second sub-period, the first sub-period corresponds to a first procedure, and the second sub-period corresponds to a second procedure; the first sub-period comprises n first time slices, different beams are used in adjacent first time slices in the n first time slices, there is a first guard interval between the adjacent first time slices, and the second sub-period comprises m second time slices; each first time slice comprises at least one symbol and each second time slice comprises at least one symbol; at least one first time slice is adjacent to at least one second time slice and there is no guard interval between the at least one first time slice and the at least one second time slice that are adjacent to each other; and m and n are positive integers; and
a communications unit, configured to perform communication by using the radio frame.

10. The apparatus according to claim 9, wherein a same beam is used in the first time slice and the second time slice that are adjacent to each other.

11. The apparatus according to claim 9, wherein all of the n first time slices are adjacent to each other.

12. The apparatus according to claim 11, wherein the first procedure is a downlink synchronization and beam training procedure, the n first time slices comprise x adjacent first time slice sets, each first time slice set comprises $n_a$ first time slices, and for each first time slice set, downlink synchronization signals are sent by using $n_a$ transmit beams.

13. The apparatus according to claim 11, wherein the first procedure is an uplink random access and beam training procedure, the first sub-period comprises b adjacent first time slice sets, each first time slice set comprises $n_b$ first time slices, for each first time slice set, uplink access signals are received by using $n_b$ receive beams, and b and $n_b$ are positive integers.

14. The apparatus according to claim 9, wherein some or all of the n first time slices are nonadjacent to each other.

15. The apparatus according to claim 14, wherein the first procedure comprises a downlink synchronization and beam training procedure, the first sub-period comprises c nonadjacent first time slice sets, each first time slice set comprises $n_c$ adjacent first time slices, for each first time slice set, downlink synchronization signals are sent by using $n_c$ transmit beams, and c and $n_c$ are positive integers.

16. The apparatus according to claim 14, wherein the first procedure comprises an uplink random access and beam training procedure, the n first time slice comprises d nonadjacent first time slice sets, each first time slice set comprises $n_d$ adjacent first time slices, for each first time slice set, uplink access signals are received by using $n_d$ receive beams, and d and $n_d$ are positive integers.

* * * * *